US012792844B2

(12) United States Patent
Smock et al.

(10) Patent No.: US 12,792,844 B2
(45) Date of Patent: Nov. 10, 2026

(54) USER INTERFACE FOR GENERATING AND MANIPULATING MOLECULAR IMAGES WITH NATURAL LANGUAGE INSTRUCTIONS

(71) Applicant: MICROSOFT TECHNOLOGY LICENSING, LLC, Redmond, WA (US)

(72) Inventors: J Brandon Smock, Seattle, WA (US); Robin Abraham, Redmond, WA (US); Maurice Diesendruck, Bellevue, WA (US); Rohith Venkata Pesala, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 340 days.

(21) Appl. No.: 18/129,778

(22) Filed: Mar. 31, 2023

(65) Prior Publication Data

US 2024/0331235 A1 Oct. 3, 2024

(51) Int. Cl.

*G06F 40/40* (2020.01)
*G06T 11/60* (2026.01)
*G06V 10/776* (2022.01)

(52) U.S. Cl.

CPC .............. *G06F 40/40* (2020.01); *G06T 11/60* (2013.01); *G06V 10/776* (2022.01)

(58) Field of Classification Search

CPC ........ G06T 11/60; G06F 40/40; G06V 10/776
See application file for complete search history.

(56) References Cited

U.S. PATENT DOCUMENTS

| | | | | |
|---|---|---|---|---|
| 12,561,963 B2 * | 2/2026 | Guo | ........................ | G06V 10/82 |
| 2004/0009813 A1 * | 1/2004 | Wind | ........................ | A63F 13/63 463/30 |
| 2006/0004706 A1 * | 1/2006 | Tomioka | .................. | G16B 5/00 |

(Continued)

FOREIGN PATENT DOCUMENTS

CN 1427254 A * 7/2003 ............... G01V 3/32

OTHER PUBLICATIONS

Chitwan Saharia et al, Photorealistic Text-to-Image Diffusion Models with Deep Language Understanding, May 23, 2022 (Year: 2022).*

(Continued)

*Primary Examiner* — Kevin Ky
(74) *Attorney, Agent, or Firm* — Benjamin Keim; Newport IP, LLC

(57) ABSTRACT

A machine learning model is used to generate molecular images by text-to-image diffusion techniques based on natural language text inputs. The machine learning model is trained on combinations of molecule images and corresponding text such that representations of both are embedded in latent space. Users provide natural language text describing molecular characteristics and the machine learning model generates an image of a molecule with those characteristics. Existing molecular images or those generated by the system can be further edited and refined with additional natural language text instructions. The system also uses machine vision techniques to understand the molecule represented by a molecular image and translate that image into other representations of the molecule.

20 Claims, 8 Drawing Sheets

(56) References Cited

U.S. PATENT DOCUMENTS

| | | | | |
|---|---|---|---|---|
| 2022/0051479 | A1* | 2/2022 | Agarwal | G06N 3/0475 |
| 2022/0180201 | A1 | 6/2022 | Sarshogh et al. | |
| 2022/0270713 | A1* | 8/2022 | Spagnoli | G16C 20/30 |
| 2022/0318596 | A1 | 10/2022 | Sarshogh et al. | |
| 2023/0351579 | A1* | 11/2023 | Trainer | G06T 7/0004 |
| 2025/0384970 | A1* | 12/2025 | Qiao | G16C 20/50 |

OTHER PUBLICATIONS

Chen, et al., "A deep generative model for molecule optimization via one fragment modification", Nature Machine Intelligence, vol. 3, Dec. 2021, pp. 1040-1049.

Edwards, et al., "Translation between Molecules and Natural Language", arXiv preprint arXiv:2204.11817, Nov. 3, 2022, 39 pages.

Hoogeboom, et al., "Equivariant Diffusion for Molecule Generation in 3D", Proceedings of the 39th International Conference on Machine Learning—PMLR, vol. 162, Jun. 16, 2022, pp. 8867-8887.

International Search Report and Written Opinion received for PCT Application No. PCT/US2024/019621, Sep. 3, 2024, 16 pages.

Nakata, et al., "End-to-end protein-ligand complex structure generation with diffusion-based generative models", BMC Bioinformatics, vol. 24, Jun. 5, 2023, pp. 1-18.

Su, et al., "A Molecular Multimodal Foundation Model Associating Molecule Graphs with Natural Language", arXiv preprint arXiv:2209.05481, Sep. 12, 2022, pp. 1-17.

Zhu, et al., "3M-Diffusion: Latent Multi-Modal Diffusion for Text-Guided Generation of Molecular Graphs", arXiv preprint arXiv:2403.07179, Mar. 11, 2024, 18 pages.

Brooks, et al., "InstructPix2Pix: Learning to Follow Image Editing Instructions", In Repository of arXiv:2211.09800v2, Jan. 18, 2023, 15 Pages.

Ho, et al., "Denoising Diffusion Probabilistic Models", In Repository of arXiv:2006.11239v2, Dec. 16, 2020, 25 Pages.

Krenn, et al., "Self-referencing Embedded Strings (SELFIES): a 100% Robust Molecular String Representation", In Article of Machine Learning: Science and Technology, vol. 1, Oct. 28, 2020, 8 Pages.

Rajan, et al., "DECIMER: Towards Deep Learning for Chemical Image Recognition", In Journal of Cheminformatics, vol. 12, Issue 1, Oct. 27, 2020, 9 Pages.

Rombach, et al., "High-Resolution Image Synthesis with Latent Diffusion Models", In Repository of arXiv:2112.10752v2, Apr. 13, 2022, 45 Pages.

International Preliminary Report on Patentability (Chapter I) received for PCT Application No. PCT/US2024/019621, Oct. 9, 2025, 10 pages.

* cited by examiner

USER INTERFACE FOR GENERATING AND MANIPULATING MOLECULAR IMAGES WITH NATURAL LANGUAGE INSTRUCTIONS

BACKGROUND

The need to design new molecules with properties that meet certain constraints is important to many applications. Subject matter experts (SMEs) in chemistry and related fields typically leverage their domain knowledge and experience when they work on such problems, taking into consideration knowledge of composition, functional groups, three-dimensional (3D) structure, etc. During the design process SMEs may leverage both their own experience and information available in patents, research publications, internal experiment reports, technical notes, and other sources. Any candidate molecule, designed by an SME or created through other means, must be verified in a lab, which is a difficult and time-consuming process.

Several machine learning approaches exist that attempt to generate novel molecules, including molecules that meet certain properties. Techniques have also been developed that predict properties like solubility, absorption, distribution, metabolism, excretion, toxicity, etc. While such techniques help with initial in silico screening of molecules, there is still a need to design molecules for study in lab experiments to confirm the in silico predictions.

Current techniques for designing molecules rely on specialized software that is difficult to use and has a high learning curve. Some such chemical drawing software programs include ChemDraw, MarvinSketch, and ACD/ChemSketch. These programs have graphical user interfaces that provide a variety of drawing tools and features. Although powerful, these interfaces are generally not intuitive and are different for each drawing program. The representations of chemicals created by these types of software are generally saved as a specialized chemical table file such as an MDL Molfile. Molfiles, or other types of chemical table files, can only be read by certain software and the raw data in a file cannot be interpreted by humans.

Designing molecules is an important part of many types of research. Current systems for doing so generally require some level of specialized expertise as well as familiarity with specialized software programs. More intuitive user interfaces and systems that incorporate the knowledge of SMEs would make designing molecules easier. The following disclosure relates to these and other considerations.

SUMMARY

This disclosure provides a novel user interface and system that enables a user to collaborate iteratively with an artificial intelligence (AI) to design molecules. For example, a user could begin the design process by asking the system in natural language to generate a molecule fitting the natural language description. The user could also ask the system in natural language to edit an existing molecule according to a specific instruction. This instruction could be open-ended, with multiple possible outcomes, or fine-grained and specific, with one specific modification outcome in mind. The system interprets the natural language request using an AI model and outputs a new molecular image to meet the request.

The system of this disclosure involves a flexible combination of components, including natural language instruction, image generation, and structured image recognition to enable the user to collaborate with an AI to design a desired novel molecule. Natural language instruction uses a large language model such as a generative pre-trained transformer (GPT) to interpret natural language text provided by the user. Molecular images are generated by a diffusion model trained on a specific type of molecular image such as skeletal structures. Text is encoded using a text-encoding model such as, but not limited to, a contrastive language-image pretraining (CLIP) model that trains a text encoder jointly with images. A text-only encoder may also be used. Relationships between natural language text and molecular images are learned by the diffusion model during training. The training includes not just features of molecules such as the number of carbons but also descriptions of properties such as solubility. Thus, the system can respond to specific instructions or direct edits such as "make it an alcohol." The system can also respond to more general instructions or edits that describe an intended property or feature such as "increase solubility."

This system acts directly on the molecular images that are shown to the user rather than by changing a specialized file representing the structure of the molecule and then rendering an image. For example, a user could edit a molecular image directly by hand either on paper or with any graphics software and provide the edited molecular image to the system. Additionally, the system can modify an image directly to fulfill a natural language instruction from the user. This creates a new molecular image from an existing image based on the user's natural language instructions.

Structured image recognition allows the system to recognize a molecule that is depicted in a molecular image through computer vision that uses a deep learning-based technique to understand the chemical meaning of the image. This allows the conversion of a flat image representation into alternate molecule representations such as a text string (e.g., SMILES) that can be readily interpreted by existing cheminformatics software. Translation of images into other modalities enables downstream integration of existing software that can analyze an alternative representation of a molecule. For example, a SMILES string may be analyzed to predict a molecule property. The system can operate on both an image depiction of a molecule and an alternative representation (e.g., text string) giving it the ability to use different representations of a molecule depending on which capabilities are needed.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
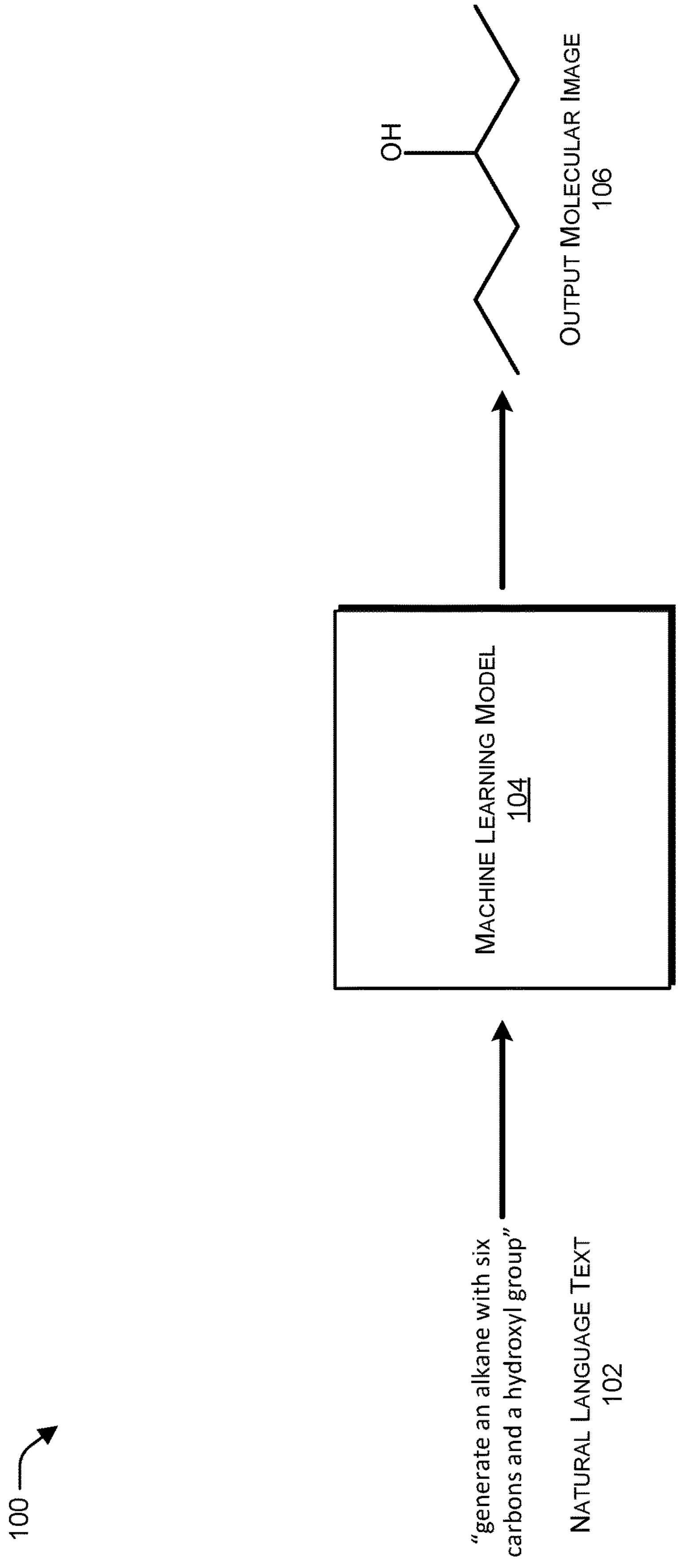
FIG. 1 is a diagram that illustrates a machine learning model generating a molecular image from natural language text.

One aspect of the system presented in this disclosure is the ability to collaborate with an AI on the molecule design process through natural language instruction, where the system generates or modifies a molecule to meet natural language requests. As used herein, "molecule" refers to the chemical entity rather than any representation of it. This system is built on a machine learning model that can understand natural language and translate this language into the action of producing a molecular image as output. Such models can produce an image depiction of a molecule as their output. Humans intuitively understand visual representations of chemical structures better than names or textual representations. This creates a system with a user interface that allows for free-form, natural language instructions to generate and modify molecular structures.

Another aspect of the system presented in this disclosure is that a user and machine learning model can iteratively design a molecule entirely by first generating a molecular image and subsequently modifying the molecular image. The molecular image generated as the output from a first iteration may be used as an input for a second iteration. The system can update the image directly using a combination of AI and standard image editing software without translating it into an alternate representation such as a text string or graph. The machine learning model of this disclosure takes advantage of recent advances in text-to-image models such as Stable Diffusion and InstructPix2Pix. The combination of all these aspects creates a system that enables an intuitive and collaborative experience between a user and an AI for designing or editing a molecule.

The deep learning, text-to-image model Stable Diffusion is described in the paper Rombach, R., Blattmann, A., Lorenz, D., Esser, P., & Ommer, B. (2022). High-resolution image synthesis with latent diffusion models. In Proceedings of the IEEE/CVF Conference on Computer Vision and Pattern Recognition (pp. 10684-10695). This work introduces a method for high-resolution image synthesis using latent diffusion models. Diffusion models are a class of generative models that can learn the probability distribution of high-dimensional data, such as images. Diffusion models are trained with the objective of applying and then removing successive applications of Gaussian noise on training images which can be thought of as a sequence of denoising autoencoders. Stable Diffusion uses a variant of diffusion models, called latent diffusion models, which apply the diffusion process on a latent space of images (using a performant autoencoder), to allow more efficient learning. To achieve these results, Stable Diffusion introduces several innovations, including a multi-stage training procedure, an adaptive sampling scheme for the diffusion process, and a regularization term that encourages the latent variables to be disentangled.

Stable Diffusion consists of three parts: a variational autoencoder (VAE), U-Net, and an optional text encoder. The VAE encoder compresses the image from pixel space to a smaller dimensional latent space, capturing a more fundamental semantic meaning of the image. Gaussian noise is iteratively applied to the compressed latent representation during forward diffusion. The U-Net block, composed of a ResNet backbone, denoises the output from forward diffusion backwards to obtain a latent representation. Finally, the VAE decoder generates the final image by converting the representation back into pixel space. The denoising step can be flexibly conditioned on a string of text, an image, or another modality. The encoded conditioning data is exposed to denoising U-Nets via a cross-attention mechanism. For conditioning on text, the fixed, pretrained CLIP ViT-L/14 text encoder is used to transform text prompts to an embedding space.

InstructPix2Pix is described in the paper Brooks, T., et al. (2022). InstructPix2Pix: Learning to Follow Image Editing Instructions. ArXiv, abs/2211.09800. InstructPix2Pix is a machine learning model that can generate image edits based on natural language instructions. The model is an extension of the Pix2Pix image-to-image translation framework, with the added capability of taking in textual descriptions of image editing tasks. The Pix2Pix GAN architecture involves the careful specification of a generator model, discriminator model, and model optimization procedure.

The first component of the InstructPix2Pix architecture is a text encoder that takes in the textual description of an image editing task and encodes it into a fixed-length latent vector. It uses a pre-trained BERT model for this purpose. The second component of the architecture is an image encoder that takes in the original image and encodes it into a fixed-length latent vector. The latent vectors from the text and image encoders are concatenated and fused into a single vector, which is then passed through a fully connected layer to generate an intermediate latent representation.

The intermediate latent representation is used as input to a generator network that takes in the original image and produces the edited image. Both the generator and discriminator models use standard Convolution-BatchNormalization-ReLU blocks of layers as is common for deep convolutional neural networks. A U-Net model architecture is used for the generator, instead of the common encoder-decoder model. The generator model takes an image as input, and unlike a traditional GAN model, it does not take a point from the latent space as input. Instead, the source of randomness comes from the use of dropout layers that are used both during training and when a prediction is made.

The edited image and the original image are then passed through a discriminator network that tries to distinguish between them. Unlike the traditional GAN model that uses a deep convolutional neural network to classify images, the InstructPix2Pix model uses a PatchGAN. This is a deep convolutional neural network designed to classify patches of an input image as real or fake, rather than the entire image. The discriminator is based on the PatchGAN architecture used in InstructPix2Pix, but with an added component that takes in the textual description of the image editing task as input. The discriminator model is trained in a standalone manner in the same way as a traditional GAN model, minimizing the negative log likelihood of identifying real and fake images, although conditioned on a source image.

During training, the model is optimized to minimize the difference between the edited image and the ground truth image, as well as the difference between the model's output and the discriminator's classification of the output as a real or fake image. During inference, the model takes in a textual description of an image editing task and an original image and generates the corresponding edited image.

Techniques for editing images with natural language text are also described in Hertz, A. et al. "Prompt-to-prompt image editing with cross attention control." arXiv preprint arXiv: 2208.01626 (2022). Hertz et al. describe a method for image editing called prompt-to-prompt editing with cross-attention control. The method is based on an architecture that includes an encoder, a decoder, and a cross-attention mechanism. The encoder maps an input image to a lower-dimensional latent space, while the decoder maps a latent code back to an image. The cross-attention mechanism is used to match parts of the input image to parts of a target image specified by a natural language prompt.

The method is trained using a combination of adversarial and reconstruction losses. During training, the encoder and decoder are optimized to minimize the reconstruction loss, while the discriminator is optimized to distinguish between real and fake images. The cross-attention mechanism is trained to match the specified target region while preserving the overall visual coherence of the generated image.

Any of the above architectures and techniques may be adapted for use with the contents of this disclosure.

FIG. 1 is a diagram 100 illustrating the use of natural language text 102 as input to a machine learning model 104 that generates an output molecular image 106. Starting without any existing molecule, the user can use natural language to describe the type of molecule and features of the molecule they would like the system to generate. The user provides natural language text 102 such as, for example, "generate an alkane with six carbons and a hydroxyl group." This results in a much more intuitive user interface than a system in which the user must learn specific menu or text commands to interact with chemical drawing software. The user provides natural language text 102 in any format that a user can provide text to a computing system. In many instances, the user will type on a keyboard but may also use voice or other input devices to generate the natural language text 102. The user may also input text from another source such as text copied and pasted from an existing document.

The machine learning model 104 takes a natural language text 102 as an input and passes it through one or more pre-trained neural networks. The machine learning model 104 then generates an output molecular image 106 from an embedding created from the natural language text 102. Depending on the specificity of the natural language text 102, there may be multiple possible molecules that satisfy the input. For example, there are multiple six-carbon alkanes that include a hydroxyl group. Thus, even though only one output molecular image 106 is shown in FIG. 1, the machine learning model 104 may generate multiple output molecular images 106.

The output from the machine learning model 104 is the image itself, not another representation of a molecule that is later rendered into an image. Thus, the machine learning model 104 is a generative text-to-image AI. The output molecular image 106 may be generated in any format for computer images. For example, the output molecular image 106 may be in a raster graphics file format (also known as bitmap images) such as JPEG, PNG, and GIF. A raster image is made up of rows and columns of dots, called pixels.

There are various ways in which chemical structures can be rendered or represented, each with its own advantages and limitations. Line-angle (skeletal) notation is a simple and widely used method for representing organic molecules, while ball-and-stick models are useful for visualizing three-dimensional structures and the relative orientations of atoms. Space-filling models can provide a more realistic representation of the molecule's size and shape, and wire-frame models are often used for visualizing large, complex molecules. Corey-Pauling-Koltun (CPK) models can be useful for highlighting different elements in a molecule, while ribbon models are commonly used for visualizing the structure of proteins. The choice of rendering method will depend on the specific purpose of the representation and the audience for which it is intended. In some implementations, a molecular image is a two-dimensional image of a molecule. In some implementations, a molecular image is a skeletal structure. The machine learning model 104 creates molecular images based on the style of images used for training. The machine learning model 104 may be trained on multiple different styles of molecular images and be able to produce multiple styles of molecular images for the same molecule.

The natural language text 102 provided by the user describes molecular characteristics the user wishes to see in the output molecular image 106. Molecular characteristics can include structural features of a molecule, properties of a molecule, and a common name of a molecule. Because the machine learning model 104 is trained on a large corpus of text and associated molecular images, it is able to generate appropriate molecular images based on properties as well as structures of molecules and common names.

Molecular characteristics that are structural features of a molecule may describe the number and type of atoms, types of bonds, and inclusion of specific chemical motifs. One example of input that provides structural features is "generate an alkane with six carbons and a hydroxyl group." Molecular characteristics can also include properties of the molecule such as volatility, solubility, hydrophobicity, toxicity, etc. This allows a user to leverage subject matter expertise encoded in the machine learning model 104 to generate molecular images of molecules with specific properties. Thus, even if the user does not know the specific molecular structure, the machine learning model 104 can create one or more output molecular images 106 of molecules with the specified properties. For example, the natural language text 102 could be instructions to "create a molecule that is a light, volatile, colorless, flammable liquid." The machine learning model 104 creates an output molecular image 106 of a molecule with these properties, for example, methanol or ethanol. This type of molecular image generation is not possible with current software tools because with conventional graphical user interfaces the user must specify specific structural features to "draw" the desired molecular image. Thus, the system provided in this disclosure makes it possible for users to explore or generate new molecules based on their properties.

If the natural language text 102 is the common name of a molecule, such as aspirin, the machine learning model 104 will generate an output molecular image 106 that shows the structure of aspirin. The way that the machine learning model 104 does this differs from systems that match a text input of a common name with a saved image. The machine learning model 104 encodes the common name into a latent space and in that latent space identifies a molecule that is encoded in the same latent space close to the encoding for the common name. The encoding of the molecule is then rendered into the output molecular image 106.

Figure 2:
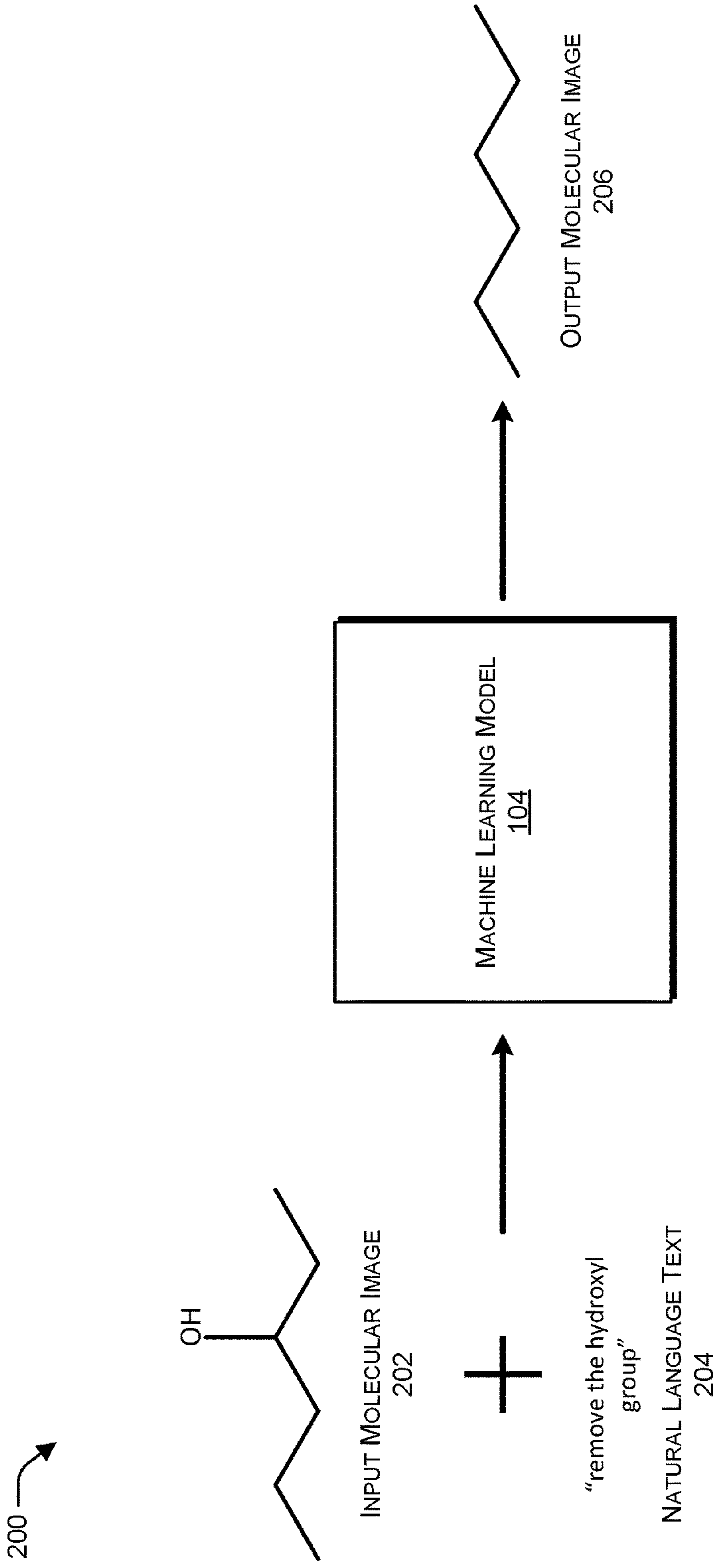
FIG. 2 is a diagram that illustrates modification of a molecular image according to natural language text.

FIG. 2 is a diagram 200 illustrating use of a machine learning model 104 to edit an input molecular image 202 according to natural language text 204. An input molecular image is any molecular image provided by the user as an input to the machine learning model. In addition to generating a molecular image in response to natural language input alone, the machine learning model 104 can also modify an input molecular image 202 based on natural language text 204 describing edits or changes to generate an output molecular image 206. Thus, the machine learning model 104 interprets the natural language text 204 together with the associated input molecular image 202. In the example shown in FIG. 2, the input "remove the hydroxyl group" may not be useful for generating a new molecular image, but it can be interpreted as instructions for modifying an input molecular image 202 that includes a hydroxyl group. This provides a much more intuitive and user-friendly interface for editing molecular images than current software.

The input molecular image 202 may come from any source of molecular images. For example, it may be created by conventional chemical structure drawing software. An image available in electronic format may also be copied from a webpage or other document and provided as the input molecular image 202. It is even possible that a user could draw a molecular image on paper by hand, scan the paper, and provide the scan as the input molecular image 202.

As mentioned above, there may be many different molecular structures that could be returned by the machine learning model 104 in response to a particular input. The machine learning model 104 will select one or more to output and display to the user. However, if the user has a specific type of molecule in mind or desires the molecule to have specific features, he or she may not be satisfied with the first output generated by the machine learning model 104. The system enables a user to iteratively interact with the machine learning model 104 where the output molecular image 206 from a first iteration becomes the input molecular image 202 for a second iteration. The user can repeat these interactions through a series of cascading edits repeatedly changing and adjusting the output molecular image 206.

Figure 3:
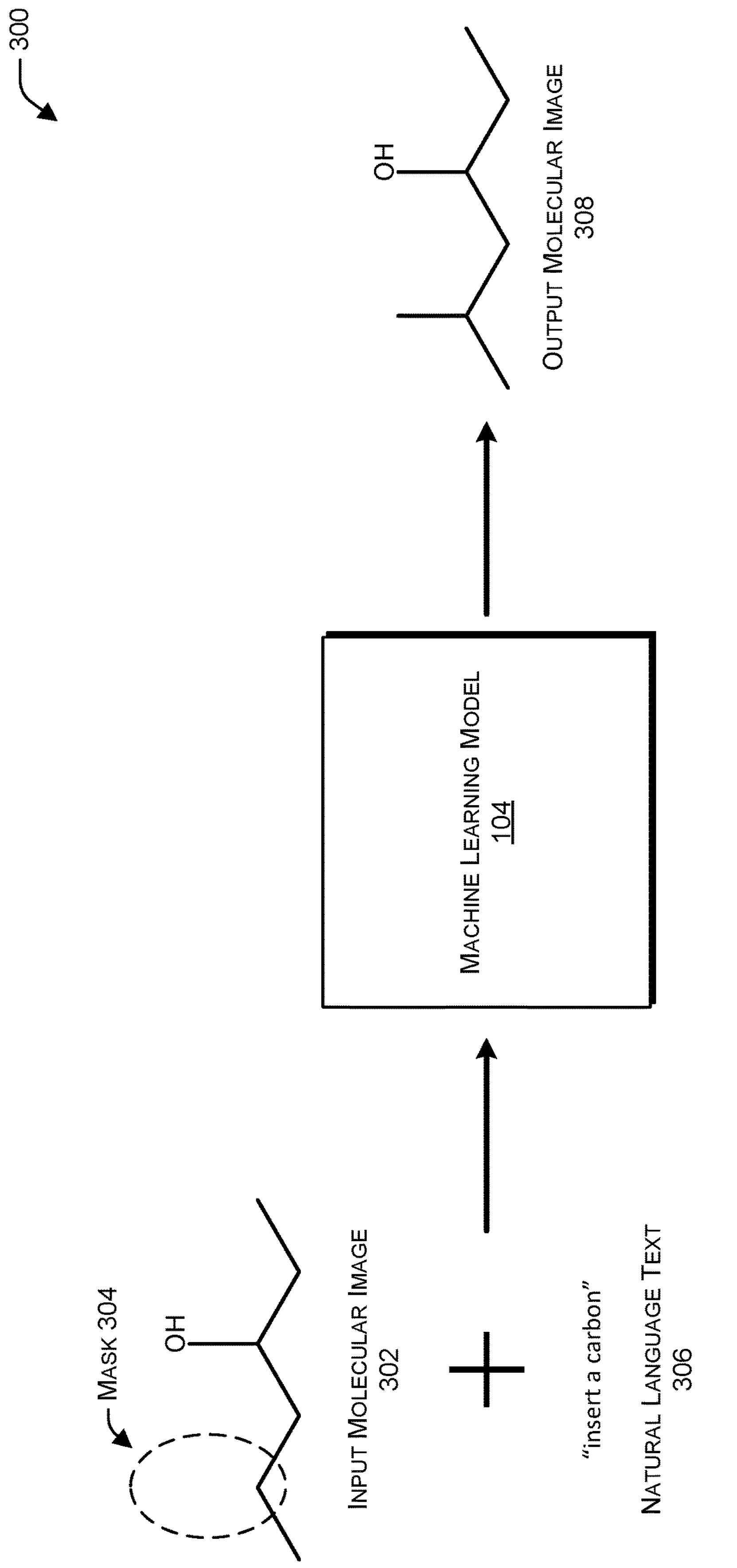
FIG. 3 is a diagram that illustrates modification of a molecular image using a mask and natural language text.

FIG. 3 is a diagram 300 illustrating use of a machine learning model 104 to edit a specific portion of an input molecular image 302 indicated by use of a mask 304. Once there is a molecular image to edit, there are many possible ways to provide instructions to the machine learning model 104 for editing the input molecular image 302. One way is by providing additional natural language text 306 that contains instructions for how to edit the molecular image as shown in FIG. 2. Although natural language text 306 is intuitive and provides great flexibility, there may be times when graphical user interface elements provide a more efficient way for the user to communicate his or her intent.

For example, a mask 304 can be used to indicate a specific portion of the input molecular image 302. The mask 304 is a way of highlighting or selecting a portion of the input molecular image 302. This type of granular control can be important when dealing with large molecules, especially when there may be ambiguity about which portion of the molecule is being referred to through the natural language text 306. The user may designate the mask 304 through any type of conventional user interface element such as by drawing a line around a part of the input molecular image 302 with a pointing tool such as a mouse or touch screen.

The machine learning model 104 then uses the input molecular image 302, the mask 304, and natural language text 306 to generate an output molecular image 308. The mask 304 indicates the portion of the input molecular image 302 that should be changed and the machine learning model 104 uses in-painting to generate a new image within the area indicated by the mask 304. In-painting works by generating new pixels for the image within the area of the mask 304 based on an understanding of the natural language text 306 and the remaining portions of the input molecular image 302. In the example shown in FIG. 3, the combination of inputs received by the machine learning model 104 is to insert a carbon in the input molecular image 302 in the area indicated by the mask 304. The mask 304 limits how the machine learning model 104 can interpret the natural language text 306 "insert a carbon" enabling the user to make more precise edits to the input molecular image 302. Thus, the machine learning model 104 interprets the natural language text 306 based on the portion of the input molecular image 302 indicated by the mask 304 and regenerates that portion of the image based on the natural language text 306.

Masking can be locally directed, i.e., using natural language text 306 to make an explicit edit at a specific location on the input molecular image 302. Masking can also be regional, i.e., using natural language text 306 to suggest an edit, wherever it is probabilistically most relevant within the portion of the input molecular image 302 indicated by the mask 304. In this way, the knowledge of a user can be introduced through selection of the mask region while still allowing the generative model to suggest the specific edits based on its training. The machine learning model 104 can even be instructed to regenerate the portion of the molecular image indicated by the mask 304 without any instructions as to how the molecular image should be changed. For example, the user interface may provide a "regenerate" button that could be activated following indication of a mask region without the need to provide natural language text 306.

The types of edits illustrated in FIGS. 2 and 3 may be referred to as "direct edits." Direct edits provide specific instructions for how to modify a molecular image. Direct edits can also be made using image editing software.

The training of the machine learning model 104 on a large corpus of natural language text describing molecules and their properties also enables the system to make "intent edits" or second order edits. An intent edit describes a property of a molecule without specifying specific structural modifications. The machine learning model 104 learns associations between natural language text and molecular structures. Thus, if the user provides an intent edit such as "make it less soluble," the machine learning model 104 can understand the intent of that language and modify the molecular image to show a molecule with lower solubility. This allows users to leverage subject matter expertise encoded in the training of the machine learning model 104. Most existing software for generating or modifying molecular images is limited to direct edits and specific structural modifications. Existing software for working with molecular images cannot make intent edits.

Figure 4:
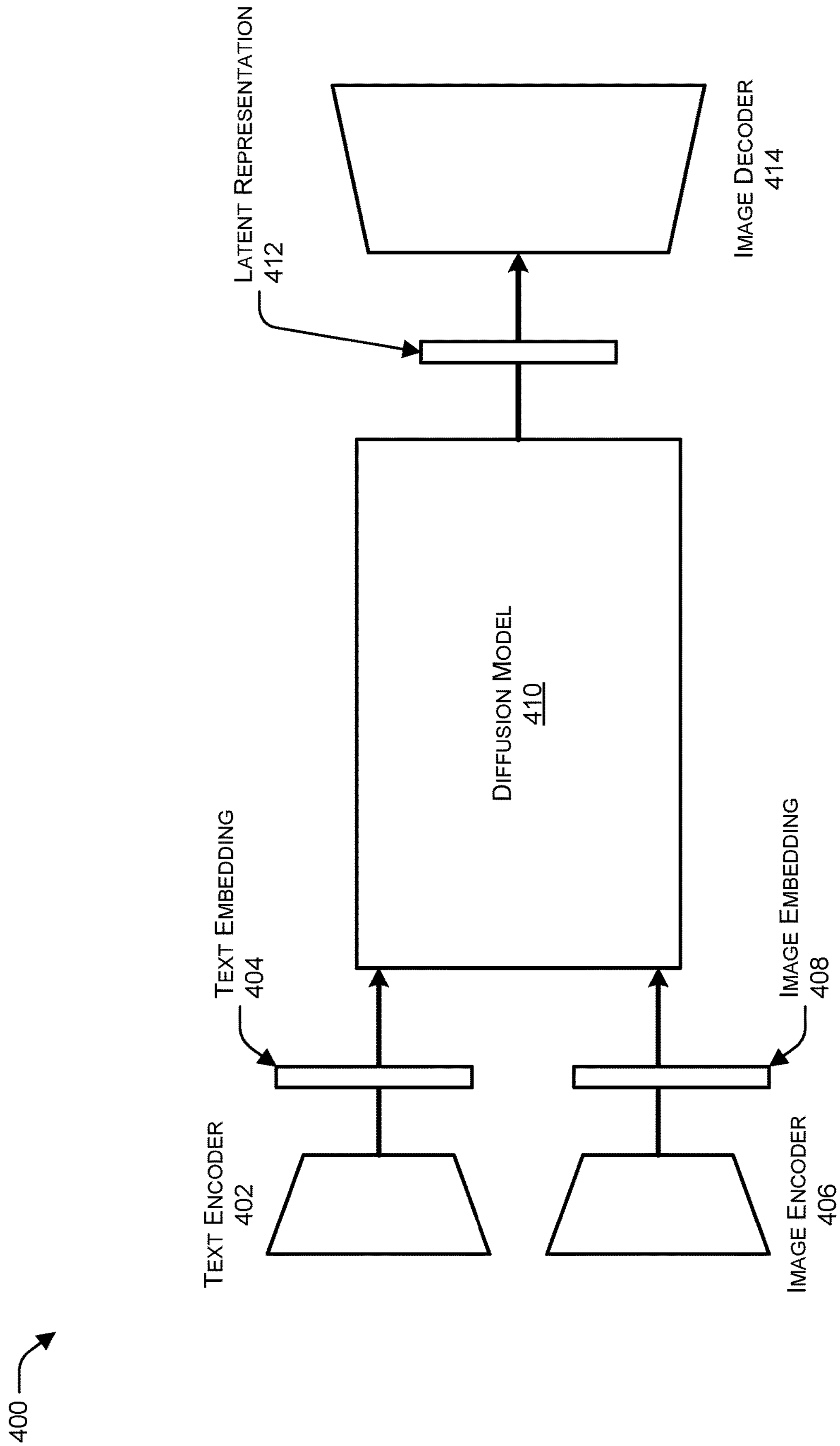
FIG. 4 is an architecture of a machine learning model for generating molecular images from natural language text and other molecular images.

FIG. 4 is a schematic diagram of one implementation of an architecture 400 of a machine learning model that generates molecular images in response to natural language text. There are existing models and architectures for AI generation of images from text (e.g., Stable Diffusion) or modification of existing images using natural language input (e.g., InstructPix2Pix). Any of these existing models or other models with similar functionality may be adapted for use with the systems of this disclosure.

The machine learning model can understand natural language text inputs. This is provided by a large language model such as a language model used for a generative pre-trained transformer (GPT) or a specifically-trained pair-wise language model. A specifically-trained pair-wise language model is a type of language model that is trained to predict the likelihood of a word or phrase given the preceding words in a sentence or sequence of text. This type of language model is called "pair-wise" because it considers pairs of words instead of individual words when making predictions. If an existing model is used, it may be further trained on text specific to descriptions of molecular structures and properties.

Thus, the architecture 400 includes a text encoder 402. The text encoder 402 takes input text and generates a text embedding 404. The text embedding 404 is a vector in a latent space. Techniques for creating an embedding from a natural language text input are known to those of ordinary skill in the art. For example, the text encoder 402 can be configured to encode natural language text into the latent space using deep learning techniques. Specifically, the text encoder 402 can be implemented as part of a neural network architecture, such as a recurrent neural network (RNN) or a transformer. For discussion of transformers see Vaswani, A. et al., (2017). *Attention is all you need. In Proceedings of the* 31*st International Conference on Neural Information Processing Systems* (NIPS 2017) (pp. 5998-6008).

The input to the text encoder 402 is a sequence of words or tokens that make up the natural language text. The text encoder 402 processes this input sequence and produces a lower-dimensional representation of the text that is the text embedding 404. The size of the text embedding 404, i.e., the dimensionality of the encoded representation, is typically much smaller than the size of the input text space. Thus, there is typically dimensionality reduction when going from natural language text to the text embedding 404.

During training, the text encoder 402 is optimized to minimize the difference between the input text sequence and a target output sequence. The target output sequence can be the same as the input text sequence, or it can be a different sequence, such as a summary or a translation of the input text. This optimization is typically done by minimizing a loss function, such as cross-entropy loss or mean squared error, between the predicted output sequence and the target output sequence.

To improve the quality of the encoded representation, a pretraining step can be used. In this step, the text encoder 402 is trained on a large corpus of text data using an unsupervised learning approach, such as a language modeling task. This pretraining step helps the text encoder 402 to learn useful representations of natural language text that can be transferred to downstream tasks.

Once the text encoder 402 is trained, it can be used to encode new natural language text into a latent space by applying the learned mapping function to the input text sequence. The resulting text embedding 404 can then be used for various downstream tasks, such as text-to-image generation. Example implementations of a text encoder 402 that may be used are provided in Stable Diffusion and InstructPix2Pix.

The text encoder 402 may be trained with Contrastive Language-Image Pre-training (CLIP) as discussed in Radford, A. et al., *Learning transferable visual models from natural language supervision*. In International conference on machine learning, pages 8748-8763 (PMLR 2021). A CLIP model is a type of neural network architecture that is capable of learning a joint representation of images and text. Specifically, CLIP is trained to map images and corresponding text descriptions into a shared latent space, where the distances between the embeddings correspond to semantic similarity. Radford et al. provide a framework for learning visual representations from natural language supervision. This technique includes a new pre-training task called CLIP that learns a joint embedding space for images and their associated textual descriptions, without any explicit alignment between the modalities.

The CLIP model is trained on a large-scale dataset of image-text pairs and learns to predict whether a given image and text snippet belong to the same concept or not. The pre-training process of CLIP involves training the model on a large dataset of image-text pairs, using a contrastive loss function. Contrastive learning involves contrasting positive pairs of image-text inputs with negative pairs to learn a representation that maximizes the similarity between positive pairs while minimizing the similarity between negative pairs. This encourages the model to map positive image-text pairs closer together in the embedding space while pushing negative pairs farther apart. This is done by randomly sampling negative image-text pairs from the training data and computing the similarity (e.g., cosine similarity, Euclidean distance, Manhattan distance, etc.) between the embeddings. The model then optimizes the contrastive loss by adjusting the parameters of the network to minimize the distance between positive pairs and maximize the distance between negative pairs.

Once the model is trained, it can be used for text-to-image generation. One feature of CLIP is that it can perform these tasks without the need for any task-specific fine-tuning, as the learned embeddings are already representative of the underlying semantics of the input images and text. Training the CLIP model includes training of a text encoder and image encoder. However, in some implementations, the image encoder that is trained as part of the CLIP model is discarded. Thus, the text encoder 402 shown in architecture 400 may be a text encoder from a CLIP model. Training the text encoder 402 jointly with images may result in a more accurate text encoder than a standalone text encoder trained only on text.

The machine learning model also has an image encoder 406 which is used both during training and when receiving an input that contains a molecular image combined with natural language text. The image encoder 406 is trained on molecular images. The image encoder 406 generates an image embedding 408 in a latent space. The latent space may, but need not, be the same latent space into which the text embedding 404 is generated. The image encoder 406 uses machine vision techniques to recognize features in molecular images and generate the image embedding 408. Example implementations of an image encoder 406 that may be used are provided in Stable Diffusion and InstructPix2Pix.

The image encoder 406 embeds a molecular image into a latent space through machine learning by learning a mapping function that takes an input image and outputs a lower-dimensional representation of that image, the image embedding 408, in the latent space. The image encoder 406 may be different from any image encoder used as part of CLIP training of the text encoder 402.

During the training phase, the image encoder 406 is trained to minimize the difference between the input molecular image and a reconstructed molecular image produced by an image decoder 414. This is done by optimizing a loss function, such as, but not limited to, mean squared error, between the input image and the reconstructed image. As a result of this optimization process, the image encoder 406 learns to extract features from the input molecular image that are relevant for reconstructing the image and encodes these features into a lower-dimensional image embedding 408. An image autoencoder consists of the image encoder 406 and the image decoder 414.

The size of the latent space, i.e., the dimensionality of the image embedding 408, is typically much smaller than the size of pixel space of the input molecular image. This enables the image encoder 406 to capture the most important information in the molecular image in a compact representation, which can be used for downstream tasks such as image generation. Once the image encoder 406 is trained, it can be used to generate new image embeddings 408 by simply applying the learned mapping function to the input molecular image.

A diffusion model 410 is conditioned on the text embedding 404 and the image embedding 408 generated by the text encoder 402 and image encoder 406. Training of the diffusion model 410 may be done with the text encoder reported to an image encoder 406 both frozen. That is, diffusion model 410 may operate without providing any feedback to the text encoder 102 or the image encoder 406.

One example diffusion process that may be used by the diffusion model 410 for generating images is Stable Diffusion. The basic idea behind text-to-image synthesis using Stable Diffusion is to use the text embedding 404 to guide the generation of an image. This text embedding 404 is then used to initialize a diffusion matrix, which represents the distribution of information across the image. During training, diffusion steps learn to invert the noising process; each time predicting the output of the denoising some number of steps ahead.

The diffusion matrix is then updated iteratively using the Stable Diffusion algorithm, with each iteration representing a diffusion step in which information is propagated across the image. During each diffusion step, the diffusion matrix is updated based on the transition matrix, which describes the flow of information between the pixels in the image. The transition matrix is constructed based on the learned relationship between the image and the text input.

The diffusion model is conditioned on the text embeddings provided by the text encoder and the image embeddings provided by the image encoder. Conditioning may also be referred to as guided diffusion. Mathematically, guidance refers to conditioning a prior data distribution $p(x)$ with a condition $y$, i.e., the class label or an image/text embedding, resulting in $p(x|y)$.

As the diffusion matrix is updated over multiple iterations, it gradually converges to a stable distribution that is a latent representation 412 of an output molecular image. The actual output molecular image is generated by an image decoder 414 applying a nonlinear transformation to the latent representation 412, which maps the distribution of information onto the pixel values of the image. The image decoder 414 decodes the latent representation 412 into a molecular image. The image decoder 414 is a component of a neural network that takes a latent representation as input and produces an image as output. In many implementations, a lower-dimensional input is used to generate a higher-dimensional image. It works by learning the probability distribution of the image data in the latent space and using this knowledge to generate new images. In the context of diffusion models, the image decoder is trained to generate images through a diffusion process, which involves gradually introducing noise into an image in a controlled way.

Although Stable Diffusion uses a latent diffusion technique, where a series of noise addition and noise removal operations are performed in the latent space with a U-Net architecture, the machine learning model of this disclosure may operate on either latent space or on the pixel space. Thus, the latent representation 412 may be generated from either a latent space or a pixel space. Stable Diffusion and most current existing text-to-image AI systems are trained on photorealistic images not on diagrammatic depictions of chemical structures. Therefore, although existing architectures can provide a framework for the machine learning model of this disclosure, some modification and additional training is necessary. This is because molecular images have unique visual characteristics that are different from those of most artwork and photographs.

For example, chemical structures drawn using skeletal structures typically consist of a set of lines or arcs representing bonds between atoms, with atoms represented by their elemental symbol or sometimes implied by the line terminus. From the perspective of a machine vision algorithm, skeletal structures typically appear as a set of 2D lines and curves with different colors and line thicknesses, where the colors and thicknesses correspond to different bond types and atomic elements with abundant white space in the images. The machine learning model learns to interpret the connectivity of the atoms based on the positions and angles of the lines and infer the identity of certain atoms based on their positions and their neighboring atoms.

The specific visual characteristics the machine learning model needs to be trained on will vary with the type of molecular image. For example, 3D space-filling models have different visual characteristics than skeletal structures.

Existing text-to-image AI systems such as Stable Diffusion may be trained to recognize and generate molecular images by exposure to appropriate training data. One technique for modifying an existing machine learning model to understand knowledge in a different domain is called transfer learning. Transfer learning can be used to produce accurate models from a small data set with much lower training costs than the original model. Techniques such as transfer learning may be used to modify an existing model to generate molecular images.

In some implementations, the architecture 400 is implemented as an autoencoder that combines the text encoder 402, the image encoder 406, and the image decoder 414. The autoencoder creates a compressed representation of an input molecular image, called the latent representation 412, which can then be used to generate new images.

The input image and text pair are passed through the diffusion model 410, which consists of a multi-layer transformer-based neural network architecture. The diffusion model 410 consists of the text encoder 402 and the image encoder 406, which encode the input image and text into a fixed-size image embedding 408 and text embedding 404, respectively. The diffusion model 410 then maps these embeddings into the latent representation 412, using a projection head, which consists of one or more fully connected layers. The latent revision 412 is then interpreted by image decoder 414 to generate an output molecular image.

The architecture 400 may also be used to edit molecular images with natural language text input as shown in FIGS. 2 and 3. This functionality may be implemented by adapting existing techniques and frameworks for natural language image editing such as those used in prompt-to-prompt and InstructPix2Pix.

Illustrative Computing Architecture

Figure 5:
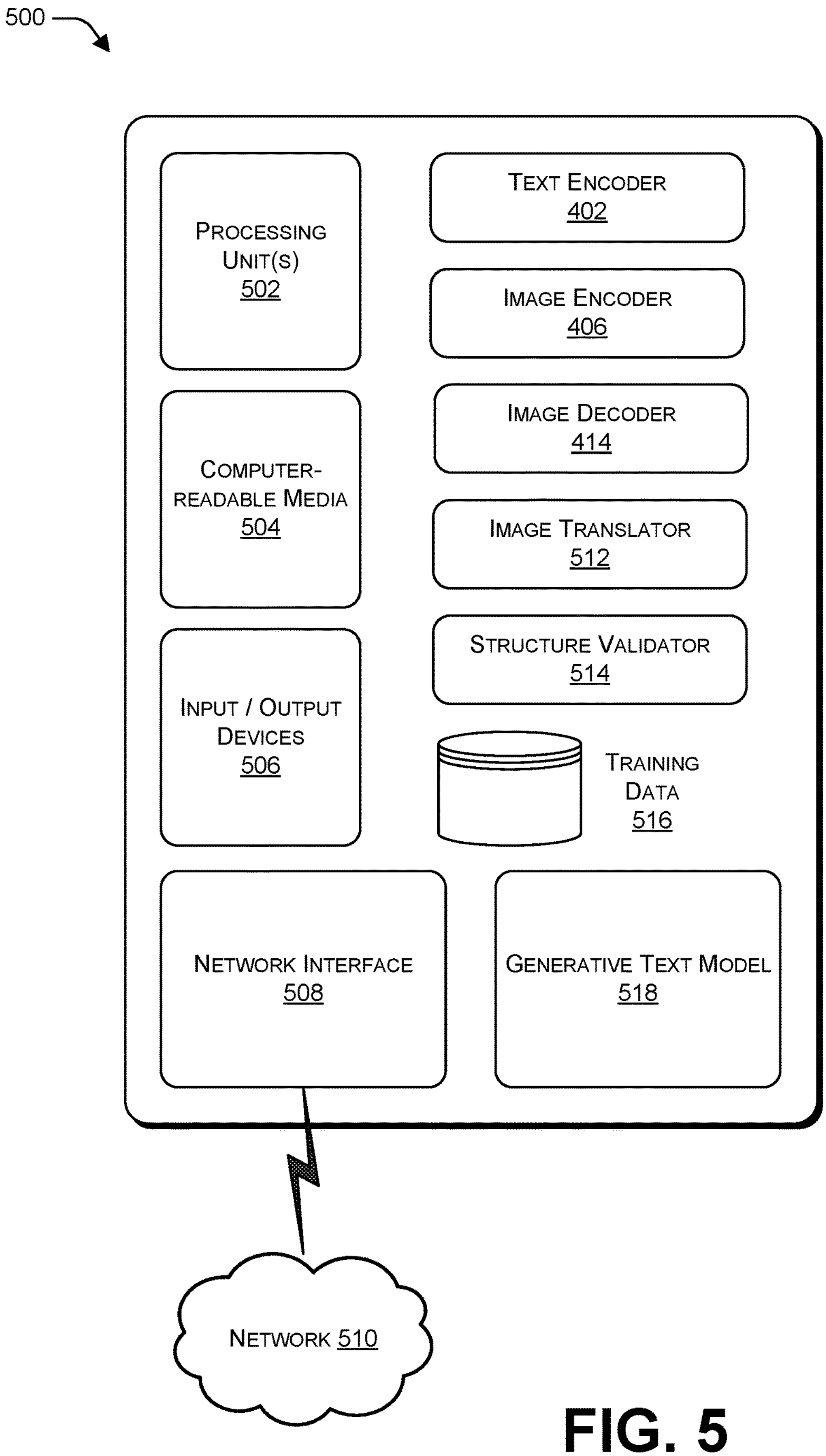
FIG. 5 is a computer architecture diagram of an illustrative computer hardware and software architecture for a computing device capable of implementing aspects of the techniques and technologies of this disclosure.

FIG. 5 shows a block diagram of an illustrative computing device 500 that may be used to implement the machine learning model 104 introduced in FIG. 1. The computing device 500 may include one or more processing unit(s) 502 and computer-readable media 504 also referred to as memory, both of which may be distributed across one or more physical or logical locations. The processing unit(s) 502 may include any combination of central processing units (CPUs), graphical processing units (GPUs), single core processors, multi-core processors, processor clusters, application-specific integrated circuits (ASICs), programmable circuits such as Field Programmable Gate Arrays (FPGA), and the like. In one implementation, one or more of the processing unit(s) 502 may use Single Instruction Multiple Data (SIMD) or Single Program Multiple Data (SPMD) parallel architectures. For example, the processing unit(s) 502 may include one or more GPUs or CPUs that implement SIMD or SPMD. A first set of processing unit(s) 502 may be used for training the machine learning model 104 such as, for example, tens or hundreds of GPUs. A second set of one or more processing unit(s) 502, such as one or more CPUs, may be used for passing inputs through the machine learning model 104 once trained.

One or more of the processing unit(s) 502 may be implemented in software and/or firmware in addition to hardware implementations. Software or firmware implementations of the processing unit(s) 502 may include computer- or machine-executable instructions written in any suitable programming language to perform the various functions described. Software implementations of the processing unit(s) 502 may be stored in whole or part in the computer-readable media 504.

Alternatively or additionally, the functionality of computing device 500 can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The computer-readable media 504 of the computing device 500 may include removable storage, non-removable storage, local storage, and/or remote storage to provide storage of computer-readable instructions, data structures, program modules, and other data. The computer-readable media 504 is coupled to the processing unit 502. Computer-readable media 504 includes at least two types of media: computer-readable storage media and communications media. Computer-readable storage media includes volatile and non-volatile, removable and non-removable media implemented in any method or technology for storage of information such as computer-readable instructions, data structures, program modules, or other data. Computer-readable storage media includes, but is not limited to, RAM, ROM, EEPROM, flash memory, solid-state storage or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast to computer-readable storage media, communication media can embody computer-readable instructions, data structures, program modules, or other data in a modulated data signal, such as a carrier wave, or other transmission mechanism. As defined herein, computer-readable storage media does not include communication media. Thus, computer-readable storage media excludes media consisting solely of a modulated data signal, a carrier wave, or a propagated signal, per se.

The computing device 500 may include one or more input/output devices 506 such as a keyboard, a pointing device, a touchscreen, a microphone, a camera, a display, a speaker, a printer, and the like. Input/output devices 506 that are physically remote from the processing unit(s) 502 and the computer-readable media 504 (e.g., the monitor and keyboard of a thin client) are also included within the scope of the input/output devices 506.

A network interface 508 may also be included in the computing device 500. The network interface 508 is a point of interconnection between the computing device 500 and a network 510. The network interface 508 may be implemented in hardware for example as a network interface card (NIC), a network adapter, a LAN adapter or physical network interface. The network interface 508 can be implemented in part in software. The network interface 508 may be implemented as an expansion card or as part of a motherboard. The network interface 508 implements electronic circuitry to communicate using a specific physical layer and data link layer standard such as Ethernet, InfiniBand, or Wi-Fi. The network interface 508 may support wired and/or wireless communication. The network interface 508 provides a base for a full network protocol stack, allowing communication among groups of computers on the same local area network (LAN) and large-scale network communications through routable protocols, such as Internet Protocol (IP).

The network 510 may be implemented as any type of communications network such as a local area network, a wide area network, a mesh network, an ad hoc network, a peer-to-peer network, the Internet, a cable network, a telephone network, and the like.

The computing device 500 includes multiple modules that may be implemented as instructions stored in the computer-readable media 504 and executed by processing unit(s) 502 and/or implemented, in whole or in part, by one or more hardware logic components or firmware. These modules may include components of the machine learning model 104 introduced in FIG. 4. Thus, the modules may include the text encoder 402, image encoder 406, and image decoder 414 introduced earlier. Additionally, the computer-readable media 504 may implement the diffusion model 410 shown in FIG. 4.

The text encoder 402 is implemented as one or more neural networks and is configured to encode a natural language text description of a molecular characteristic into a latent space. The text encoder 402 may be trained on text and images or on text alone. Multiple techniques for encoding natural language text into a latent space are known to those of ordinary skill in the art and any suitable technique may be used.

The image encoder 406 is implemented as one or more neural networks and is configured to encode an input molecular image into a latent space. The image encoder 406 may be trained on text and images or on images alone. Multiple techniques for encoding images into a latent space are known to those of ordinary skill in the art and any suitable technique may be used.

The image decoder 414 is implemented as one or more neural networks configured to decode a latent representation 412 generated by diffusion model 410 into an output molecular image. The diffusion model 410 is a stochastic generative model that iteratively adds noise to pixel values and allows for local interactions between neighboring pixels, resulting in the generation of complex and varied patterns for image generation tasks. Diffusion models include both those models that add noise to pixels directly as well as the latent diffusion models that add noise to a latent variable which is a hidden variable that captures the high-level semantic information of an image. Multiple techniques for generating images using diffusion from latent representations are known to those of ordinary skill in the art. Any suitable technique may be adapted for use as the diffusion model 410 and the image decoder 414. The image decoder 414 combined with one or both of the text encoder 402 and image encoder 406 may also be implemented as an autoencoder.

The computing device 500 may also include an image translator 512. The image translator 512 translates molecular images into one or more alternative representations. The molecular images processed by the image translator 512 may be those generated by the machine learning model of this disclosure or they may come from any other source.

As mentioned above, the output provided by the machine learning model of this disclosure is a molecular image in the format of an image file. Visual representations of molecules are easy for humans to understand but difficult for machines. Existing cheminformatics software is not able to interpret molecular images when presented as images. Thus, the image translator 512 can translate molecular images into a different modality that may then be provided as input to cheminformatics software for downstream analysis. The alternative representation may be, for example, a text string representation or a molecular graph. Examples of text string representations of molecules include Simplified Molecular Input Line Entry System (SMILES), DeepSMILES, International Chemical Identifier (InChI) codes, SELF-referencing Embedded Strings (SELFIES), and Protein Data Bank (PDB) files. Other formats for representing molecules in computer-readable form include MDL Molfiles (MOL) and Chemical Markup Language (CML). An MDL Molfile is a file format for holding information about the atoms, bonds, connectivity, and coordinates of a molecule. The molfile consists of some header information, the Connection Table (CT) containing atom info, then bond connections and types, followed by sections for more complex information. CML is an approach to managing molecular information using tools such as XML and Java.

The image translator 512 may be designed so that it can translate a molecular image into any known or later developed alternative representations of a molecule. Techniques exist for converting many of these alternative representations of a molecule into another representation (e.g., SMILES into InChI). Thus, once the image translator 512 converts the molecular image into a first representation that can be processed by existing computer-based techniques, that representation can be translated into any of the other modalities.

The image translator 512 may itself be a machine learning model that operates by analyzing the visual information provided in a molecular image to gain an understanding of the molecule represented by that image. One example machine learning technique for understanding the visual information contained in a molecular image generates a graph based on nodes and edges detected in a molecular image. Specifically, atoms of the molecular image are interpreted as nodes while bonds between atoms are interpreted as edges. Both the types of atoms (e.g., oxygen, nitrogen, phosphorus, etc.) and the types of bonds (e.g., single, double, as well as chirality) are classified by the machine learning model to generate a molecular graph. An embedding is generated from the molecular graph. The embedding is used to predict a text string representation of the molecule. One example of this technique for using machine vision and machine learning to convert a molecular image into an alternative representation is provided in U.S. Pub. No. 2023/0196179 filed on Dec. 20, 2021, with the title "Inferring Graphs from Images and Text."

The computing device 500 may also include a structure validator 514. The structure validator 514 is configured to determine if an output molecular image generated by the machine learning model is syntactically valid. Syntactic validity is a concept in molecular chemistry that refers to the compliance of a molecular structure with the established rules of chemical bonding and valency. A molecular structure is syntactically valid if it follows the principles of syntax, including the satisfaction of the octet rule, the appropriate number and types of covalent bonds, and the correct molecular geometry and shape.

Because the machine learning model uses a generative process to create an output molecular image based on images used for training, there is the possibility it could create a molecular image that visually looks similar to a true molecular image but has an error or invalid structural element, an image that looks correct but is not syntactically valid. Also, given the open-ended and flexible types of inputs that can be provided through natural language, there will be many instances in which the machine learning model can produce multiple different molecular images in response to a user prompt. The structure validator 514 may be used to screen the output molecular images and only present valid molecular structures to the user.

One existing software tool that can be used to validate molecular structures is RDKit. RDKit is an open-source cheminformatics toolkit that can be used for validating representations of molecules provided in a variety of formats such as MOL, SMILES, CML, Protein Data Bank (PDB), and InChI. RDKit is available on the World Wide Web at rdkit.org.

RDKit is also an example of a downstream tool that can be used to analyze and make further predictions about a molecular structure generated by the machine learning model. RDKit is a software library that can be used to manipulate, analyze, and visualize chemical structures, as well as to perform various types of chemical computations. RDKit provides a set of functions and algorithms that can be used to convert the structural information of a molecule, represented as a series of atoms and bonds, into various types of data that can be analyzed and visualized. For example, RDKit can be used to calculate the molecular weight, the number of atoms, and the number of bonds in a given molecule. It can also be used to generate 2D and 3D visualizations of the molecule, as well as to calculate various types of properties such as solubility and lipophilicity.

The computing device 500 may also contain or have access to training data 516 which is used to train the machine learning model. In many instances, the computing device

500 that is used to train the machine learning model is different than the computing device or devices used to query the model. The training data 516 includes pairs of molecular images and textual descriptions of the molecular images. All of the molecular images in the training data 516 may be of the same style such as skeletal structures. In such a case, the machine learning model will generate output molecular images that are skeletal structures. Thus, the style of molecular image used for training determines what style of output molecular images are generated by the machine learning model. The machine learning model may be trained on any type of molecular image as well as on multiple different styles of molecular images.

The training data 516 can be collected from existing sources such as scientific publications, textbooks, the Internet, and chemical databases. Examples of some databases that may be suitable sources of training data 516 are PubChem (available on the World Wide Web at pubchem.ncbi.nlm.nih.gov) and AlphaFold DB (available on the World Wide Web at alphafold.ebi.ac.uk). PubChem is a free chemical database and search engine that provides information on the properties, structure, and biological activity of over 100 million molecules. AlphaFold DB is an online tool that predicts the three-dimensional structure of a protein based on its amino acid sequence using deep neural networks and evolutionary information.

Some of the source materials may have text that is already associated with a molecular image. In this case, the existing text and image are used for training. However, training data 516 may also be automatically generated with software tools including generative artificial intelligence. For example, if there are textual descriptions of a molecule that lacks a molecular image, a tool such as RDKit may be used to generate a 2D or 3D image of the molecule based on another representation such as a MOL file or SMILES text string. This generated image is then associated with the existing text and used as training data 516. For example, PubChem includes information about properties and characteristics of many molecules identified by their common names and SMILES. This textual information available from PubChem may be combined with molecular images generated by RDKit or other software to create training data 516.

A generative text model 518 may be used to create additional training data 516 by generating additional text that describes characteristics or features of a molecule from existing human-generated text. The generative text model 518 may use a large language model that is similar to or different from that used by the text encoder 402. The generative text model 518 may be used to generate natural language text that is similar to the types of natural language prompts a user would provide to the machine learning model. This improves training by creating training data 516 which is more similar to the type of natural language text that a user will likely provide to the text encoder 402 as prompts.

For example, the generative text model 518 may take longer passages of text such as a published scientific article and generate a number of shorter (e.g., single sentence) statements that describe various features and properties of molecules mentioned in the original document. The generative text model 518 may also be used to create textual descriptions of molecular characteristics that are included in the training data 516 in other forms such as numeric or tabular. For example, solubility for a molecule may be presented in a database such as PubChem as 10 grams/100 mL of water. The generative text model 518 may be used to generate a short textual statement that describes the solubility such as "moderately soluble in water at room temperature." Additionally, it may be used to generate synonyms and alternate phrasings for molecular characteristics included in the training data 516. Training places these texts generated by the generative text model 518 into the latent space close to the latent representation of the molecule thereby creating more specific and robust training data 516 than is available from original documents.

Illustrative Methods

Figure 6:
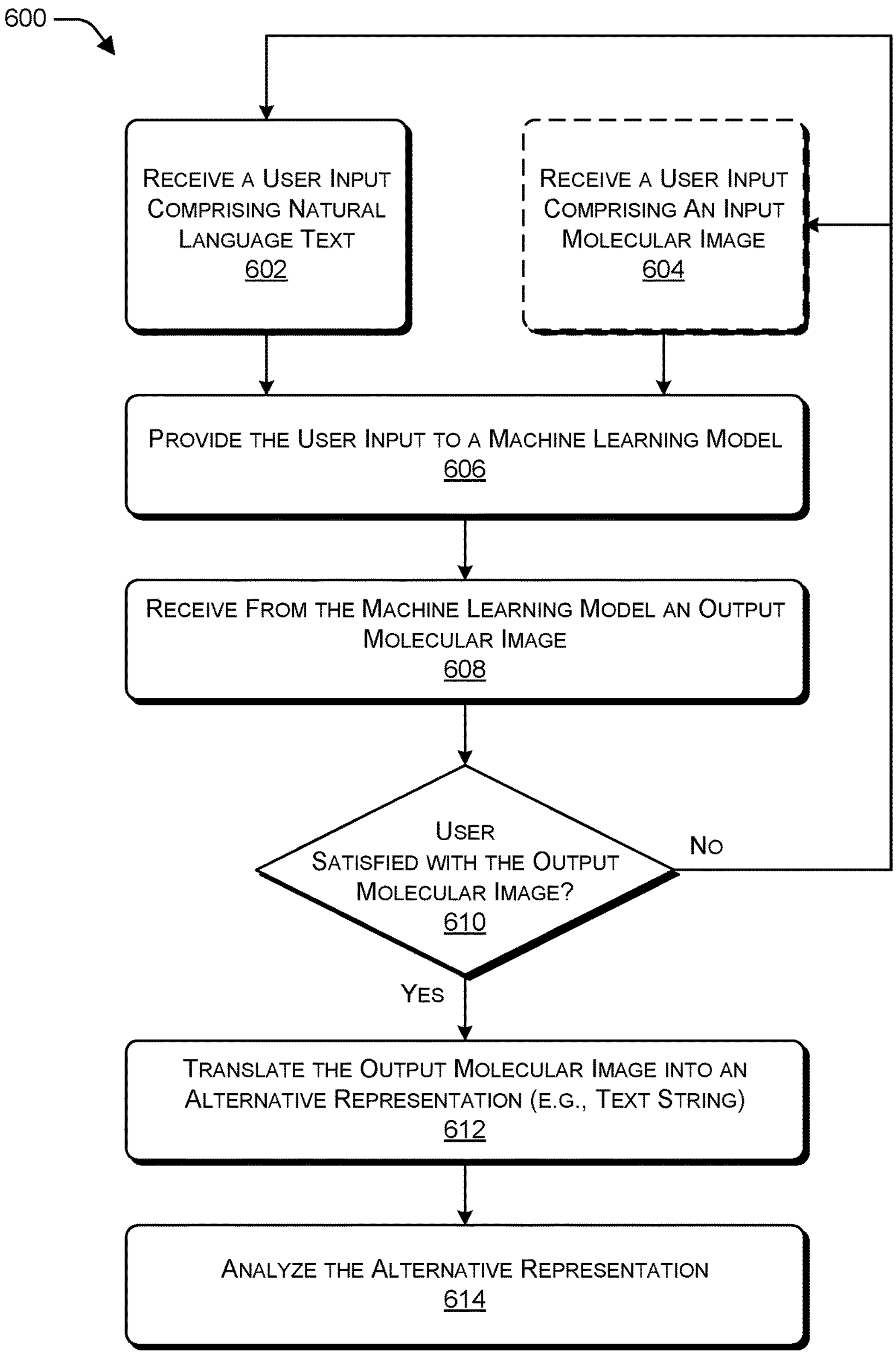
FIG. 6 is a flow diagram of an illustrative method for a user to iteratively interact with a machine learning model that generates molecular images from natural language text.
Figure 7:
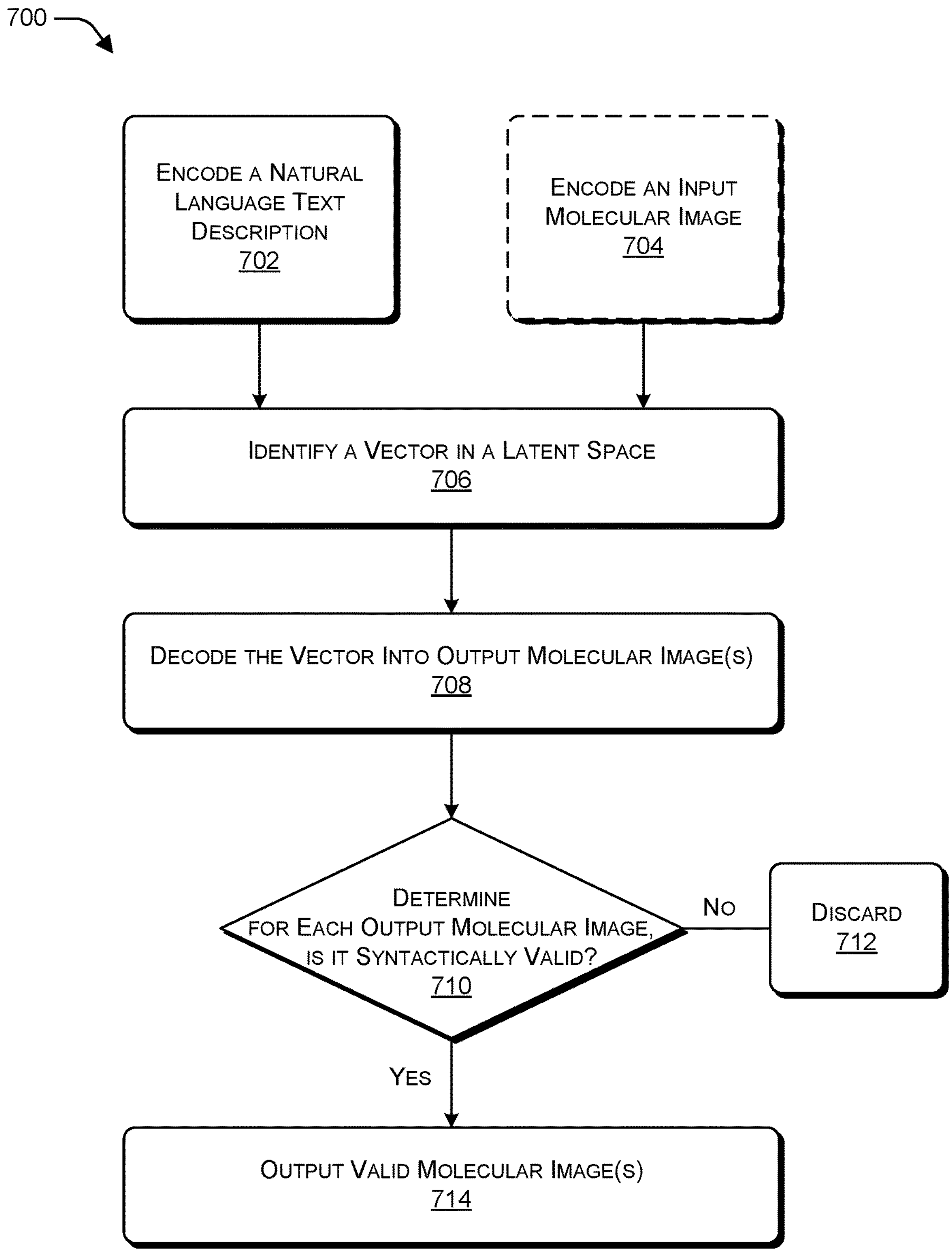
FIG. 7 is a flow diagram of an illustrative method for generating one or more output molecular images with a machine learning model.
Figure 8:
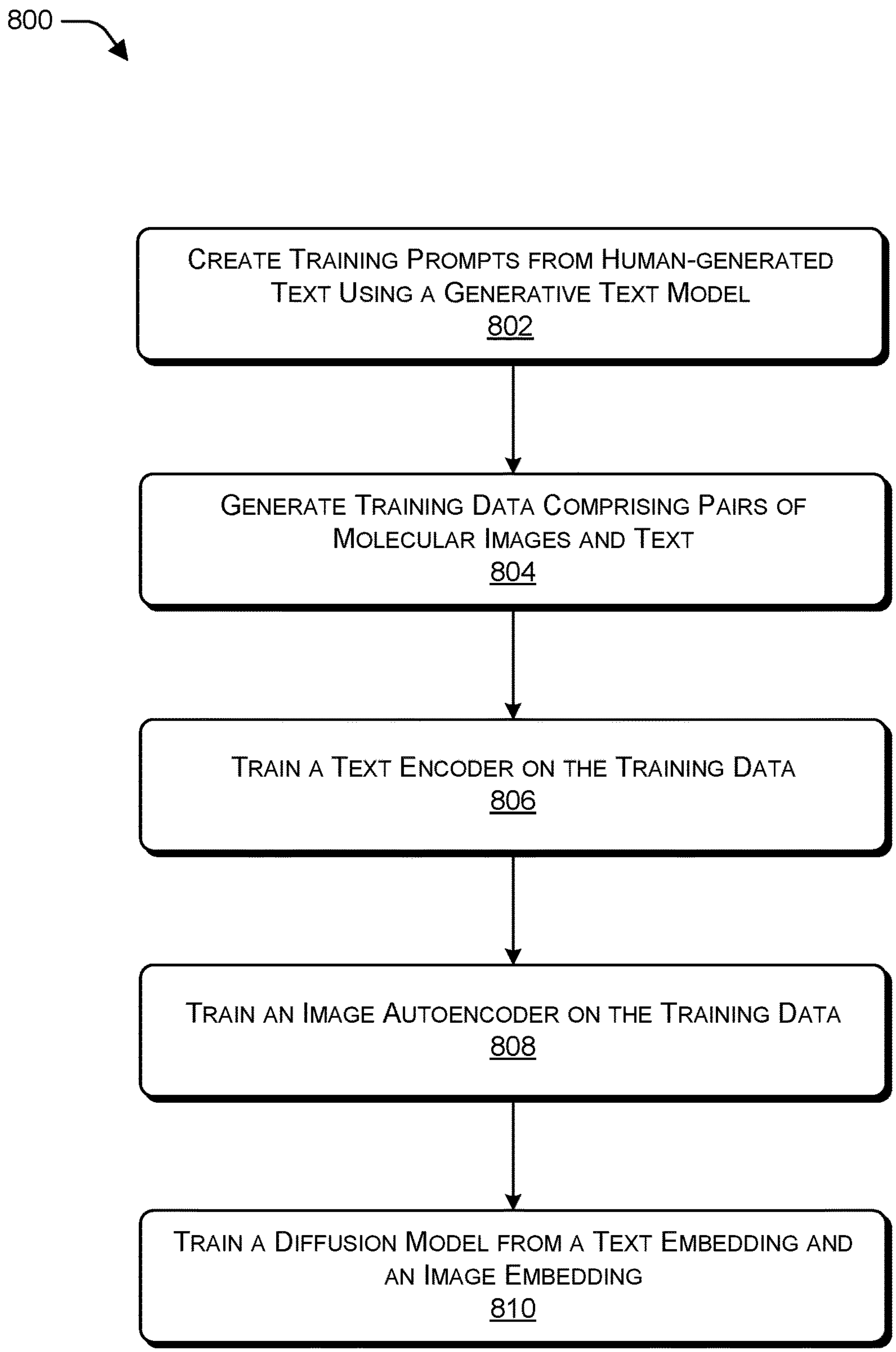
FIG. 8 is a flow diagram of an illustrative method for training a machine learning model to generate molecular images from natural language text.

For ease of understanding, the processes discussed in FIGS. 6-8 are delineated as separate operations represented as independent blocks. However, these separately delineated operations should not be construed as necessarily order dependent in their performance. The order in which a process is described is not intended to be construed as a limitation, and any number of the described process blocks may be combined in any order to implement the process or an alternate process. Moreover, it is also possible that one or more of the provided operations is modified or omitted.

FIG. 6 is a flow diagram of an illustrative method 600 for iteratively interacting with a machine learning model to generate a molecular image from natural language text. Method 600 may be implemented with the machine learning model architecture shown in FIG. 4 and the computing device shown in FIG. 5.

At operation 602, a user input comprising natural language text describing a molecular characteristic is received. The natural language text is provided by a user and may be text generated as a prompt by the user or it may be text taken from another source such as text that is cut and pasted from an existing document. The molecular characteristic may be a feature of the molecule, a property of the molecule, or a common name of the molecule. For example, the user may provide a prompt that says: "create a molecule that is hydrophobic and contains phosphorus."

At operation 604, user input comprising an input molecular image is received. User input may be text alone or it may be text accompanied by an input molecular image. If an input molecular image is also received, that image is provided together with the natural language text to the machine learning model. The molecular image may be provided as an image (e.g., a raster or pixel image) and is not required to be in a special format for chemical structures. The user may generate the molecular image with conventional chemical drawing software, copy the image from an existing document, or even draw the molecular image by hand and scan the drawing. If the user input includes both an input molecular image and natural language text, the natural language text will typically be instructions for modifying the input molecular image. For example, natural language text received at operation 602 may instruct "add a hydroxyl group" which will be interpreted by the machine learning model as a prompt to add a hydroxyl group to the accompanying input molecular image received at operation 604.

At operation 606, the user input is provided to a machine learning model. The user input may be natural language text received at operation 602 or it may be the natural language text and an input molecular image received at operation 604. The machine learning model is trained on pairs of molecular images and associated text. For example, the machine learning model may be trained on the training data 516 shown in FIG. 5. The natural language text can be provided to the machine learning model through a text encoder trained on a large language model. The input molecular image can be provided to the machine learning model through an image encoder. Both the natural language text and any input molecular image, if present, are embedded into latent spaces by the respective encoders.

In some implementations, the user input also includes an indication of a mask applied to the input molecular image. The mask indicates a portion of the input molecular image on which the natural language text should be applied to modify the input molecular image. The user may indicate the mask through any conventional input technique for indicating a portion of an image. When a mask is provided, the machine learning model interprets the natural language text based on a portion of the input molecular image indicated by the mask. Thus, if the natural language text indicates "make that a double bond" then the machine learning model will identify bonds present in the portion of the input molecular image indicated by the mask and change one or more of those bonds to a double bond.

At operation 608, an output molecular image is received from the machine learning model. The output molecular image may be displayed to the user. In some implementations, multiple molecular images are received and only a subset of those images are displayed to the user. For example, in one implementation, only those molecular images that represent syntactically valid molecules are displayed to the user. The output molecular image may be displayed on a user device that is different and physically remote from a computing device that implements the machine learning model.

The machine learning model may comprise a text encoder, an image encoder, and an image decoder that generates the output molecular image with a diffusion model. Thus, the output molecular image is generated by the machine learning model using diffusion. The diffusion model generates a latent representation of the output molecular image from a text embedding created from a natural language text description of the molecular characteristics. For example, the machine learning model may sample in the latent space based on the natural language text by picking a random location in the latent space for image generation and combining that with the text embedding of the natural language text. This is then fed into a diffusion denoiser which is implemented as the image decoder.

When the user input also includes an input molecular image, the output molecular image is identified by the machine learning model by proximity in the shared latent space to an encoding of the input molecular image and the encoding of the natural language text. Thus, the image embedding of the input molecular image as modified by the text embedding of the natural language text is used as the starting point in the latent space for image generation. One way this may be done is to generate a caption or textual description of the input molecular image. This caption is then modified by the natural language text provided by the user to create a new caption. For example, if the input molecular image is ethanol and the natural language text is "add a carbon," then the machine learning model may make the caption "an alkane with two carbons combined with a hydroxyl group." This caption is then modified to make a new caption such as "an alkane with three carbons combined with a hydroxyl group." The image decoder would then generate an image of propanol from the representation of this new caption in the latent space.

At operation 610, the user is either satisfied with the output molecular image or not. As mentioned above, this machine learning model can be used iteratively and interactively by the user. Thus, the user can evaluate each output molecular image, or set of images, and determine if it is what he or she intended to create. The user may go through any number of rounds of iterations with the model revising and modifying the output molecular image. If the user is not yet satisfied with the output molecular image, method 600 returns to operation 604.

Upon returning to operation 604, the input molecular image is the output molecular image from the previous iteration. This is combined with a new natural language text prompt received at a subsequent iteration of operation 602. The inputs are again provided to the machine learning model at operation 606, and a revised molecular image is received from the machine learning model at operation 608. This can proceed until the user is satisfied with the output molecular image. Once the user is satisfied, method 600 proceeds along the "yes" path to operation 612.

At operation 612, the output molecular image is translated by a second machine learning model into an alternative representation of the molecule. The second machine learning model may be, for example, a neural network that is trained to recognize the graph structure of a molecular image and from that graph structure determine an alternative representation of the same molecule. For example, the output molecular image could be translated into a text string such as a SMILES representation. The output molecular image could also be translated into any other type of representation of the molecule. The translation may be performed by image translator 512 shown in FIG. 5.

At operation 614, the alternative representation of the molecule created at operation 612 is analyzed. Representations of a molecule other than an image are generally easier for existing cheminformatics software to use as inputs. Thus, translation into another representation, such as SMILES, makes it easy to provide the molecule as an input for downstream analysis by other software. This analysis may include any type of conventional analysis of molecules such as calculation of molecular weight, determination of solubility, prediction of toxicity, and submission as a query to a database. The alternative representation of the molecule may be provided to a tool such as RDKit for analysis.

FIG. 7 is a flow diagram of an illustrative method 700 for a machine learning model to generate a valid molecular image from a natural language textual description. Method 700 may be implemented with the machine learning model architecture shown in FIG. 4 and the computing device shown in FIG. 5.

At operation 702, a natural language text description of a molecule or molecular characteristic is encoded into a latent space creating a text embedding. The natural language text description may be encoded by a text encoder such as the text encoder 402 shown in FIG. 4. Natural language text can be any text provided by the user. Encoding of the natural language text creates a vector in a latent space.

At operation 704, an input molecular image is encoded into a latent space. This may be the same latent space into which the text is embedded, or it may be a different latent space. The input molecular image may be encoded by the image encoder 406 shown in FIG. 4. The input molecular image may be provided as a raster or pixel image without any specific molecular information encoded in it beyond the arrangement of pixels. Encoding of the input molecular image is implemented by a machine vision technique that captures an understanding of the molecule represented by the molecular image.

At operation 706, a vector is identified in a latent space created by a diffusion model based on the encoding of the natural language text description and, if present, encoding of the input molecular image. The vector, or latent representation, identified in the latent space may be a vector that is close to the text embedding and close to the image embedding. The proximity may be measured by any technique for identifying closeness between vectors in a latent space such as cosine similarity, Euclidean distance, and Manhattan distance.

At operation 708, the vector identified at operation 706 is decoded into one or more output molecular images. The decoding may be performed by the image decoder 414 shown in FIG. 4. Decoding converts a latent representation into an image. The image is made by a diffusion model that gradually removes noise through a series of denoising steps to create an image such as a skeletal representation of a molecule.

At operation 710, each output molecular image created at operation 708 is evaluated to determine if it represents a syntactically valid molecule. The evaluation may be performed by first translating the output molecular image into an alternative representation such as a text string and then passing the alternative representation through an existing tool for analyzing syntactic validity. For example, syntactic validity may be determined by the structure validator 514 shown in FIG. 5.

Because the diffusion process is based on a probabilistic denoising model, some outputs from a latent representation could represent structures that, while appearing generally to be molecular images, have a flaw or error which would not be present in a molecular image of an actual molecule. These images can be identified and for each image that does not represent a syntactically valid molecule, method 700 proceeds along the "no" path.

At operation 712, the output molecular images that are not syntactically valid are discarded. Discarded molecular images are not shown to a user. However, if there are syntactically valid output molecular images, method 700 proceeds along the "yes" path to operation 714.

At operation 714, one or more valid molecular images generated by the machine learning model are output for presentation to the user. The valid molecular images may be transmitted from a computing device that implements the machine learning model to a user computing device on which the user can view the valid molecular images. Each of the valid molecular images that are output from the machine learning model may be saved in memory. Any one of these molecular images may be retrieved from memory and used as an input at operation 704 during a subsequent iteration of image generation. In this implementation, it is the image file itself, not a latent representation of the molecule that is saved and reused as a subsequent input.

FIG. 8 is a flow diagram of an illustrative method 800 for training a machine learning model. Method 800 may be implemented with the machine learning model architecture shown in FIG. 4 and the computing device shown in FIG. 5.

At operation 802, training prompts are created from human-generated text by a generative text model. The training prompts are short textual passages similar to the natural language prompts that a user would likely provide to the machine learning model. The generative text model may be any type of generative text model. For example, the training prompts may be short statements generated from longer human-generated text, textual statements describing information presented numerically or tabularly, and synonyms or alternative phrasing for information provided in human-generated text. The training prompts may indicate a feature or property of a molecule.

At operation 804, training data is generated that comprises pairs of molecular images and text describing the molecular images. This is labeled training data that may be collected from existing sources such as databases, books, and the Internet. The text is the label that describes an associated molecular image. The molecular images may be any type of molecular image such as, for example, skeletal structures. Generating the training data may include harvesting the data from original sources, filtering the data, and cleaning the data. Machine-generated training data may also be used. The machine-generated training data can include molecular images generated from other representations of a molecule such as a common name or text string description like SMILES. Techniques for generating a 2D or 3D molecular image from a common name, text string, or other representation of a molecule are known to those of ordinary skill in the art. Machine-generated training data can also include the training prompts generated at operation 802. Thus, the training data includes a combination of molecular images and associated text either or both of which may be generated automatically by computer systems from other training data.

At operation 806, a text encoder is trained on the training data generated at operation 804. Any type of text encoder that converts input text into a latent representation may be used. The text encoder may be trained on only the text from the training data or trained on a combination of the text and images. In one implementation, the text encoder is trained together with an image encoder so that each pair of a molecular image and text describing the molecular image are encoded together in a shared latent space. The training may include contrastive pre-training. Contrastive pre-training includes training the model on pairs of images and text descriptions and optimizing the similarity score between matching pairs while minimizing it between mismatched pairs. This process creates a shared latent space where the model can accurately associate image and text data. One suitable technique for contrastive pre-training is described in Radford et al.

If the text encoder is trained jointly with an image encoder, the image encoder may be discarded once training of the text encoder is complete. Thus, in this implementation, the image encoder is used only to influence the training of the text encoder.

At operation 808, an image encoder is trained on the training data. The image encoder may be trained only on the image data. The image encoder may use reinforcement learning based on syntactic validity of the output molecular images. Reinforcement learning is used to train the machine learning model by defining a reward function and iteratively updating the generator based on the rewards received by a discriminator. The reinforcement learning penalizes output molecular images that are not syntactically valid molecules. The syntactic validity of each output molecular image generated by the machine learning model during training may be determined by the structure validator 514 shown in FIG. 5. With reinforcement learning, the image encoder is trained to only generate molecular images that represent a syntactically valid molecule.

At operation 810, diffusion model is trained from text embeddings created by the text encoder and image embeddings created by the image encoder. The diffusion model is trained to create latent representation based on an input text embedding and/or an input image embedding. The latent representation produced by the diffusion model is provided to an image decoder to generate an output molecular image. The image decoder may be a component of an autoencoder trained using a diffusion probabilistic model. The image decoder is a neural network that takes a sequence of tokens (usually generated from text) and produces an image. The diffusion model as part of an autoencoder may be trained to generate images by sampling from a noise distribution and mapping it to the output latent space through a sequence of diffusions. During training, the diffusion model learns to minimize the difference between the generated image and the target image through backpropagation, and the weights of the network are adjusted using an adaptive optimization algorithm such as stochastic gradient descent.

Illustrative Embodiments

The following clauses describe multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A method for generating a molecular image of a molecule from a natural language input, the method comprising: receiving a user input comprising natural language text describing a molecular characteristic of the molecule; providing the user input to a machine learning model trained on pairs of molecular images and associated text; and receiving from the machine learning model an output molecular image, wherein the output molecular image is generated by the machine learning model using diffusion conditioned on an encoding of the natural language text describing the molecular characteristic of the molecule.

Clause 2. The method of clause 1, wherein the natural language text comprises an intent edit that describes a property of the molecule without specifying a specific structural modification.

Clause 3. The method of clause 1 or 2, wherein the user input further comprises an input molecular image and wherein the output molecular image is identified by the machine learning model by proximity in a latent space to an encoding of the input molecular image and an encoding of the natural language text.

Clause 4. The method of clause 3, wherein the input molecular image is the output molecular image from a previous iteration.

Clause 5. The method of clause 3 or 4, wherein the user input further comprises an indication of a mask and the machine learning model interprets the natural language text based on a portion of the input molecular image indicated by the mask.

Clause 6. The method of any of clauses 1 to 5, further comprising: translating the output molecular image by a second machine learning model into an alternative representation of the molecule.

Clause 7. The method of any of clauses 1 to 6, wherein the molecular characteristic is one or more of a feature of the molecule, a property of the molecule, or a common name of the molecule.

Clause 8. The method of any of clauses 1 to 7, wherein the machine learning model comprises a text encoder, an image encoder, and an image decoder that generates the output molecular image with a diffusion model.

Clause 9. A system for generating a molecular image of a molecule from a natural language input, the system comprising: a processing unit; memory coupled to the processing unit; a text encoder, stored in the memory and executed by the processor, configured to encode a natural language textual description of a molecular characteristic into a latent space; an image encoder, stored in the memory and executed by the processing unit, configured to encode an input molecular image into the latent space; and an image decoder, stored in the memory and executed by the processor, configured to decode a vector embedded in the latent space created by a diffusion model into an output molecular image using diffusion.

Clause 10. The system of clause 9, wherein the text encoder comprises a Generative Pre-trained Transformer (GPT) language model or a specifically-trained pair-wise language model.

Clause 11. The system of clause 9 or 10, wherein the image encoder is trained on the molecular images.

Clause 12. The system of any of clauses 9 to 11, further comprising an image translator, stored in the memory and executed by the processing unit, configured to convert a molecular image into an alternative representation of the molecule.

Clause 13. The system of any of clauses 9 to 12, further comprising a structure validator, stored in the memory and executed by the processing unit, configured to determine if the output molecular image is syntactically valid.

Clause 14. The system of clause 13, wherein the image decoder is configured to produce multiple output molecular images and the structure validator is configured to remove ones of the multiple output molecular images that are not syntactically valid.

Clause 15. A method for training a machine learning model to generate a molecular image of a molecule from a natural language input, the method comprising: generating training data comprising pairs of molecular images and text describing the molecular images; training a text encoder on text from the training data, wherein the text encoder generates text embeddings; training an image encoder on images from the training data, wherein the image encoder generates image embeddings; and training a diffusion model on pairs of the text embeddings and image embeddings such that the diffusion model is conditioned to generate an image latent representation that can be converted to a molecular image by an image decoder.

Clause 16. The method of clause 15, wherein the molecular images comprise skeletal structures.

Clause 17. The method of clause 15 or 16, wherein at least a portion of the text describing the molecular images is training prompts that describe a molecular characteristic of the molecule, the training prompts created by a generative text model from human-generated text.

Clause 18. The method of any of clauses 15 to 17, wherein the text encoder is trained jointly with text from the training data and images from the training data using contrastive pre-training.

Clause 19. The method of any of clauses 15 to 18, wherein the text encoder and the image encoder are frozen prior to training the diffusion model.

Clause 20. The method of any of clauses 15 to 19, further comprising training the image decoder on images from the training data without text from the training data.

CONCLUSION

While certain example embodiments have been described, including the best mode known to the inventors for carrying out the invention, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. Skilled artisans will know how to employ such variations as appropriate, and the embodiments disclosed herein may be practiced otherwise than specifically described. The accompanying claims and their equivalents are intended to cover such forms or modifications as would fall within the scope and spirit of certain of the inventions disclosed herein.

The terms "a," "an," "the" and similar referents used in the context of describing the invention are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different sensors).

In closing, although the various configurations have been described in language specific to structural features and/or methodological acts, it is to be understood that the subject matter defined in the appended claims is not necessarily limited to the specific features or acts described. Rather, the specific features and acts are disclosed as example forms of implementing the claimed subject matter.

Furthermore, references have been made to publications, patents and/or patent applications throughout this specification. Each of the cited references is individually incorporated herein by reference for its particular cited teachings as well as for all that it discloses.

The invention claimed is:

1. A method for generating a molecular image of a molecule from a natural language input, the method comprising:

receiving a user input comprising natural language text describing a molecular characteristic of the molecule, an input molecular image, and an indication of a mask that highlights or selects a portion of the input molecular image;

providing the user input to a generative machine learning model trained on pairs of molecular images and associated text;

receiving from the generative machine learning model an output molecular image, wherein the mask limits how the generative machine learning model interprets the natural language text and the generative machine learning model interprets the natural language text based on the portion of the input molecular image indicated by the mask such that the output molecular image is generated by the generative machine learning model using diffusion conditioned on an encoding of the natural language text as interpreted based on the portion indicated by the mask; and providing the output molecular image for displaying.

2. The method of claim 1, wherein the natural language text comprises an intent edit that describes a property of the molecule without specifying a specific structural modification.

3. The method of claim 1, wherein the output molecular image is identified by the generative machine learning model by proximity in a latent space to an encoding of the input molecular image and an encoding of the natural language text.

4. The method of claim 1, wherein the input molecular image is the output molecular image from a previous iteration.

5. The method of claim 1, further comprising: translating the output molecular image by a second machine learning model into an alternative representation of the molecule.

6. The method of claim 1, wherein the molecular characteristic is one or more of a structural feature of the molecule, a property of the molecule, or a common name of the molecule.

7. The method of claim 1, wherein the generative machine learning model comprises a text encoder, an image encoder, and an image decoder that generates the output molecular image with a diffusion model.

8. The method of claim 1, wherein the generative machine learning model generates an edit to the portion of the input molecular image indicated by the mask based on probabilistic relevancy.

9. A system for generating a molecular image of a molecule from a natural language input, the system comprising:

a processing unit;

memory coupled to the processing unit having instructions encoded thereon that cause the system to perform acts comprising:

receiving a user input comprising natural language text describing a molecular characteristic of the molecule;

providing the user input to a generative machine learning model trained on training data comprising pairs of molecular images and associated text, wherein the training data is generated by:

creating training prompts from human-generated text using a generative text model, and pairing one of the training prompts describing a molecular characteristic of a molecular image with the molecular image;

receiving from the generative machine learning model an output molecular image, wherein the output molecular image is generated by the generative machine learning model using diffusion conditioned on an encoding of the natural language text describing the molecular characteristic of the molecule; and providing the output molecular image for displaying.

10. The system of claim 9, wherein the natural language text comprises an intent edit that describes a property of the molecule without specifying a specific structural modification.

11. The system of claim 9, wherein the user input further comprises an input molecular image and wherein the output molecular image is identified by the generative machine learning model by proximity in a latent space to an encoding of the input molecular image and an encoding of the natural language text.

12. The system of claim 11, wherein the input molecular image is the output molecular image from a previous iteration.

13. The system of claim 11, wherein the user input further comprises an indication of a mask, wherein the mask highlights or selects a portion of the input molecular image, and the generative machine learning model interprets the natural language text based on the portion of the input molecular image indicated by the mask.

14. The system of claim 9, wherein the acts further comprise: translating the output molecular image by a second machine learning model into an alternative representation of the molecule, wherein the alternative representation is a text string representation or a molecular graph.

15. The system of claim 9, wherein the molecular characteristic is one or more of a structural feature of the molecule, a property of the molecule, or a common name of the molecule.

16. The system of claim 9, wherein the generative machine learning model comprises a generator implemented as a U-Net architecture, the generator receiving an image input rather than a latent vector, and wherein dropout layers are used during both training and prediction such that randomness in the output molecular image is provided by the dropout layers.

17. Computer-readable storage media comprising instructions that, when executed by a processing unit, cause a computing device to perform acts comprising:

receiving a user input comprising natural language text describing a molecular characteristic of a molecule and an input molecular image, wherein the natural language text comprises an intent edit that describes a change in a physical property of the molecule without specifying a specific structural modification;

providing the user input to a generative machine learning model trained on pairs of molecular images and associated text describing properties of molecules shown in the molecular images;

receiving from the generative machine learning model an output molecular image representing a molecule that has the physical property, wherein the output molecular image is generated by the generative machine learning model using diffusion conditioned on an encoding of the natural language text describing the molecular characteristic of the molecule; and providing the output molecular image for displaying.

18. The computer-readable storage media of claim 17, wherein the user input further comprises the input molecular image and wherein the output molecular image is identified by the generative machine learning model by proximity in a latent space to an encoding of the input molecular image and an encoding of the natural language text.

19. The computer-readable storage media of claim 18, wherein the input molecular image is the output molecular image from a previous iteration.

20. The computer-readable storage media of claim 18, wherein the user input further comprises an indication of a mask, wherein the mask highlights or selects a portion of the input molecular image, and the mask limits how the generative machine learning model interprets the natural language text based on the portion of the input molecular image indicated by the mask such that the output molecular image is generated by the generative machine learning model using diffusion conditioned on an encoding of the natural language text as interpreted based on the portion indicated by the mask.

* * * * *